United States Patent
Parsons

(10) Patent No.: US 6,871,835 B2
(45) Date of Patent: Mar. 29, 2005

(54) FLOW CONTROL VALVE WITH AUTOMATIC SHUTOFF CAPABILITY

(75) Inventor: Natan F. Parsons, Brookline, MA (US)

(73) Assignee: Arichell Technologies, Inc., West Newton, MA (US)

( * ) Notice: Subject to any disclaimer, the term of this patent is extended or adjusted under 35 U.S.C. 154(b) by 309 days.

(21) Appl. No.: 10/177,327

(22) Filed: Jun. 20, 2002

(65) Prior Publication Data

US 2003/0234375 A1 Dec. 25, 2003

(51) Int. Cl.⁷ .............................................. F16K 31/00
(52) U.S. Cl. ...................... 251/83; 251/128; 251/149.6; 251/30.03
(58) Field of Search ........................ 251/83, 82, 30.03, 251/30.04, 128, 149.4, 149.6; 137/614.05

(56) References Cited

U.S. PATENT DOCUMENTS

| | | | | |
|---|---|---|---|---|
| 2,503,563 A | * | 4/1950 | Ray | ............................ 251/291 |
| 2,570,593 A | * | 10/1951 | Ray | ............................ 251/128 |
| 3,715,032 A | * | 2/1973 | Nicko | ......................... 210/133 |
| 4,034,423 A | | 7/1977 | Milnes | |
| 4,077,876 A | | 3/1978 | Southall | |
| 4,200,121 A | * | 4/1980 | Walter et al. | .......... 137/614.05 |
| 4,221,235 A | * | 9/1980 | Maldavs | ................. 137/614.04 |
| 4,378,028 A | * | 3/1983 | Weber et al. | .......... 137/614.05 |
| 4,818,397 A | | 4/1989 | Joy | |
| 4,832,310 A | | 5/1989 | Nestich | |
| 5,126,041 A | | 6/1992 | Weber et al. | |
| 5,486,288 A | | 1/1996 | Stanford et al. | |
| 5,586,748 A | * | 12/1996 | Kish | ...................... 137/614.05 |
| 5,607,582 A | * | 3/1997 | Yamazaki et al. | ........... 251/149 |
| 5,695,168 A | | 12/1997 | Williams | |
| 5,744,030 A | * | 4/1998 | Reid et al. | ................ 251/149.6 |

* cited by examiner

*Primary Examiner*—John Bastianell
(74) *Attorney, Agent, or Firm*—Foley Hoag LLP

(57) ABSTRACT

A valve includes a housing having a fluid inlet and a fluid outlet and defining a fluid flow path between the inlet and the outlet. A check valve positioned in the housing has a valve seat in the flow path from the inlet, a valve member movable between a seated position against the valve seat blocking fluid flow from the inlet past the valve seat and an unseated position spaced away from the valve seat, and a spring for biasing the valve member toward the seated position. A main valve assembly is removably positioned at a home position in the housing in the flow path to control the fluid flow from the check valve to the outlet. The valve assembly has a portion which engages the valve member and maintains the valve member in it's unseated position so long as the main valve assembly is at the home position, the valve member being moved to the unseated position by the spring upon removal of the main valve assembly from the housing.

14 Claims, 1 Drawing Sheet

FLOW CONTROL VALVE WITH AUTOMATIC SHUTOFF CAPABILITY

BACKGROUND OF THE INVENTION

1. Field of the Invention

This invention relates generally to flow control valves. It relates especially to a valve for controlling the flushing of urinals or toilets, although the invention also has application to other types of valves.

2. Background Information

A typical flush control valve includes a housing with an inlet, an outlet and a valve seat located in the flow path between the inlet and outlet. A valve member in the housing is movable toward and away from the valve seat to control the flow of water from the inlet to the outlet. The valve member is moved between these two positions by an actuator of some kind. The actuator may be a lever arm or button which is linked to the valve member mechanically and/or hydraulically. Alternatively, the actuator may be an electromechanical device such as a solenoid controlled by a proximity sensor which senses the presence of someone positioned close to the valve. In any event, the typical flush control valve is designed so that once the valve member is unseated by the actuator, the valve remains open for a selected period of time before shutting off. That valve-open time may be controlled hydraulically in the case of a manually actuated valve or electronically in the case of a solenoid actuated valve.

During the operating life of flow control valves of this general type it becomes necessary to clean, repair or replace various valve parts such as seals, gaskets, filters and the like. In the case of the valves whose on-time is controlled hydraulically by water flow through small orifices or passages in the valves, dirt and minerals can accumulate those passages, thereby altering the on time of the valve and necessitating a cleaning of those passages. When such maintenance or repair is required, it is necessary to stop the flow of water upstream from the valve seat. For this reason, a manual shut off valve is invariably installed in the water line feeding the flow control valve.

In some cases, that manual shut off valve may be difficult to turn because it has not been used for a long period of time. In other instances, the shut off valve is located in a hard-to-reach place behind a fixture or even inside a partition. In a worst case scenario, there may be no such valve requiring the water mains to be turned off. Resultantly, a simple repair of a flow control valve may take an excessive amount of time and effort because of the necessity to turn off the water flow to the valve.

SUMMARY OF THE INVENTION

Accordingly, the present invention aims to provide an improved flow control valve.

Another object of the invention is to provide a valve of this general type whose internal parts can be accessed without turning off the flow of water to the valve.

Yet another object of the invention is to provide a flow control valve whose internal parts can be cleaned, repaired and replaced in a minimum amount of time.

A further object is to provide such a valve which can be oriented easily to suit different plumbing installations.

Other objects will, in part, be obvious and will, in part, appear hereinafter. The invention accordingly comprises the features of the construction, combination of elements and arrangement of parts which will be exemplified in the following detailed description, and the scope of the invention will be indicated in the claims.

Briefly, the subject flow control valve comprises a housing having an inlet adapted for connection to a water feed line and an outlet for connection to a fixture, e.g. toilet, urinal, etc. Movably positioned inside the housing in the flow path between the inlet and the outlet are a valve seat and a valve member movable toward and away from the valve seat. The valve member is normally biased against the valve seat so that no water can flow from the inlet to the outlet. The valve member may be unseated by an actuator which may be a manually operated actuator or an electromechanical actuator. In either case, when the actuator unseats the valve member, water will flow from the inlet to the outlet for a predetermined time.

It is a feature of this invention that the valve seat and movable valve member comprise a main valve assembly which is releasably retained within the housing by retaining means. The main valve assembly may comprise a diaphragm valve, piston-type valve of both the O-ring and lip-seal varieties, or other valve commonly used to control fluid flow.

Also, the housing contains a check valve in the fluid path between the inlet and that valve assembly. Normally, that check valve is maintained in an open condition by the valve assembly. However, when the retaining means are loosened to remove the valve assembly from the housing, the check valve automatically closes thereby stopping the flow of water from the inlet to the interior of the housing beyond the check valve. Therefore, when it becomes necessary to repair or replace any part of the valve assembly, the entire valve assembly can be removed from the housing without having to stop the flow of water to the flow control valve, i.e., without having to locate and turn off a manual shut off valve in the water feed line to the flow control valve.

Another feature of the present valve, to be described in detail later, is its ability to be coupled to feed or drain lines approaching in the valve from various directions thus avoiding the need to stock valves with different handedness.

As we shall see, the incorporation of the above shut off feature into a flow control valve of otherwise more or less conventional construction involves the addition of only a relatively few simple parts which can be manufactured in quantity relatively inexpensively. Therefore, providing the valve with these added features does not appreciably increase the overall cost of the product.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF AN ILLUSTRATIVE EMBODIMENT

Figure 1:
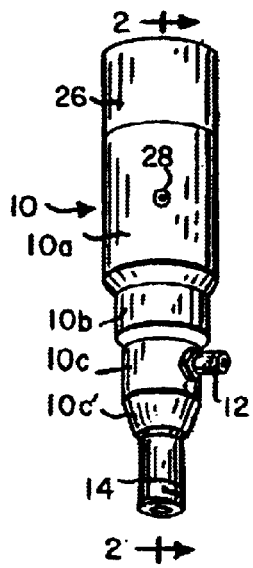
FIG. 1 is a perspective view of a flow control valve incorporating the invention.
Figure 2:
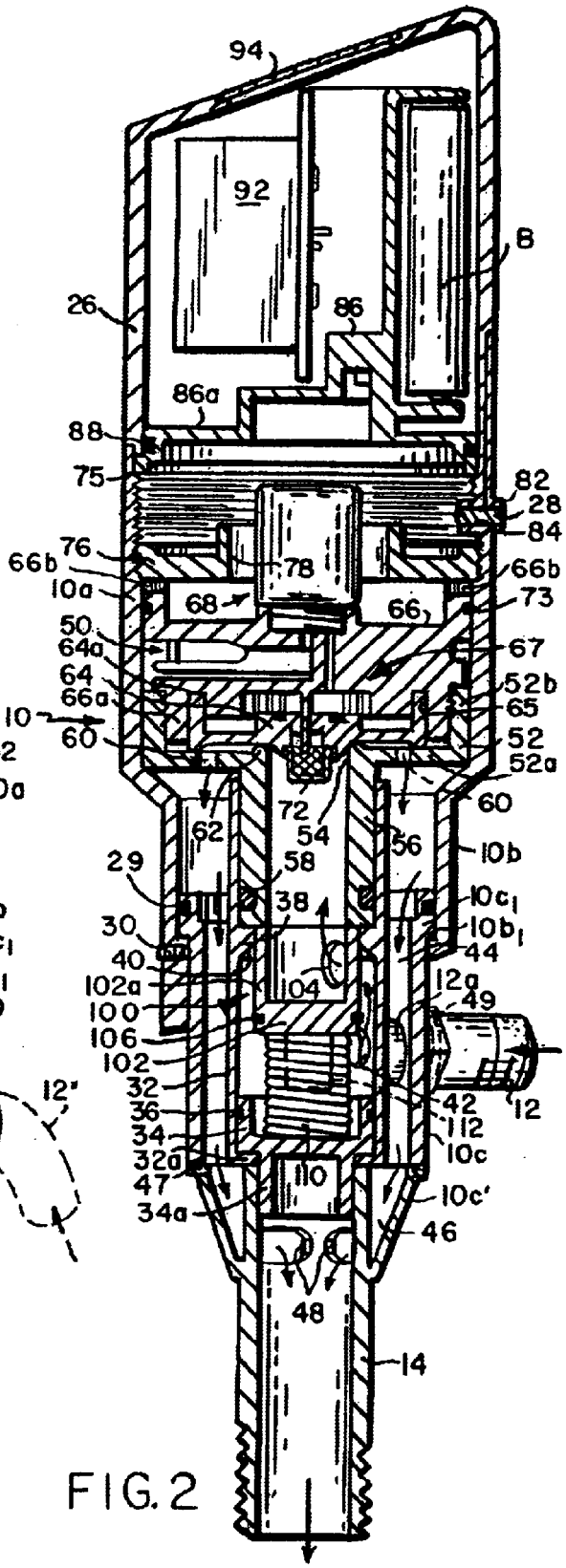
FIG. 2 is a sectional view on a much larger scale taken along line 2—2 of FIG. 1 and showing the valve's automatic shut off in its disabled or open condition.

Referring to FIGS. 1 and 2 of the drawing, the valve comprises a housing shown generally at 10. The housing includes a relatively large diameter upper section 10a which necks down to a smaller diameter intermediate section 10b which leads, in turn, to a still smaller diameter section 10c. A valve inlet 12 extends into the interior of the housing through the side wall of section 10c and a valve outlet 14 extends from the lower end of the housing, the outlet being in fluid communication with the interiors of section 10c and a tapered extension 10c' thereof. The upper end of housing section 10a is open and may be closed by a cap 26 releasably secured to section 10a by suitable fastening means such as a set screw 28. As we shall see, cap 26 contains the valve actuator and control electronics. When the valve is in use, the inlet 12 is connected to a water feed line (not shown) and the outlet 14 is connected to a fixture (not shown), such as a urinal or other device that requires flushing.

Many automatic flow control valves such as valve 10 must have a selected orientation when installed so that the valve actuator or proximity sensor at the front of the valve faces the user. In the case of valve 10, the front of the valve is located at the left side of FIG. 2. On the other hand, the water feed line for servicing the valve may approach the valve from either the left side or the right side. Therefore, in order to be able to make the connection to the valve inlet, the prevailing practice has been to make and stock some valves whose inlets extends to the left and other valves whose inlets extends to the right.

It is a feature of valve 10 that the upper end of the valve housing, i.e., sections 10a and 10b, which supports cap 26 is rotatable relative to housing section 10c containing inlet 12 about the longitudinal axis of the valve.

More particularly, as shown in FIG. 2, housing section 10c has a radial flange $10c_1$ at its upper end which seats on a shelf $10b_1$ at the lower end of the housing section 10b. Also flange $10c_1$ is grooved to accommodate an O-ring 29 to provide a rotary seal between housing sections 10b and 10c. Thus, when installing valve 10, housing section can be oriented about the vertical axis of the valve as needed to enable the inlet 12 to be coupled to a water feed (or drain) line extending to the valve from any direction perpendicular to the valve axis. Then, the upper end of the valve can be rotated relative to section 10c as needed so that the valve front faces the user of the valve. If desired, that relative position may be fixed by a set screw 30 threaded into housing section 10b and engaging section 10c, (FIG. 2).

As shown in FIG. 2, the valve outlet 14 extends up inside housing extension 10c' to the lower end of section 10c. Seated on the upper end of outlet 14 is a long tube 32 which extends from the lower end of housing section 10c to the upper end of section 10b. Tube 32 has a reduced diameter lower end that forms an inside annular flange 32a on which is seated a cup-like bushing 34 having a reduced diameter tubular lower end segment or stem 34a which extends through the opening in flange 32a down into the upper end of outlet 14. The bushing thus centers the lower end of tube 32 so that the tube is coaxial with outlet 14.

Bushing 34 is provided with a circumferential groove containing an O-ring 36 to provide a seal between the bushing and the inside wall of tube 32. Also, tube 32 is formed with an inside flange 38 more or less midway along its length. While the upper surface of flange 38 is flat and horizontal, the lower surface thereof is upwardly-inwardly beveled to form a valve seat 40.

Still referring to FIG. 2, the valve inlet 12 has an extension 12a that extends to tube 32 and communicates with the interior of that tube through an opening 42 in the side wall thereof. Thus, water entering inlet 12 is free to flow into tube 32. Also, there is an annular space 44 between the tube 32 and the side walls of housing sections 10b and 10c which communicates with an annular space 46 between housing section extension 10c' and the upper end segment of outlet 14. Fluid communication between the latter space 46 and the interior of outlet 14 is provided by one or more openings 48 in the segment of outlet 14 within extension 10c'. Thus, any water in space 44 can flow out of the housing 10 through space 46, openings 48 and outlet 14.

As shown in FIG. 2, a main valve assembly, indicated generally at 50, is situated primarily in the housing section 10a. The invention does not concern the valve assembly 50 per se so that assembly will not be described in detail. The illustrated valve assembly is a diaphragm-type valve but it could be any other type of flow control valve. An exemplary solenoid-actuated valve assembly is described in my U.S. Pat. No. 5,125,621, the contents of which is hereby incorporated herein by reference. Suffice it to say that the illustrated assembly 50 comprises a cylindrical cup-like member 52 seated at the bottom of housing section 10a. Member 52 has an axial opening 54 and a neck 56 extending down from the perimeter of that opening into the upper end segment of tube 32, the lower end of neck 56 seating on flange 38 in tube 32. Preferably, a circumferential groove is provided adjacent to the lower end of neck 56 to accommodate an O-ring 58 which provides a sliding seal between neck 56 and tube 32.

The cup-like member 52 has a bottom wall 52a and a cylindrical side wall 52b situated just inside the side wall of housing section 10a. Bottom wall 52a is provided with a circular array of through holes 60 which establish fluid communication between the region above bottom wall 52a and the annular space 44 below that wall in housing sections 10b and 10c. Also, bottom wall 52a is formed with an upstanding circular ridge surrounding opening 54 therein which functions as a primary valve seat 62 for the flush control valve.

The valve assembly 50 also includes a movable valve member 64 in the form of a flexible discoid diaphragm having a skirt 64 which is slidably received in a circular slot 65 in the underside of a generally cylindrical block 66. The valve member 64 is arranged to normally seat against the primary valve seat 62. The valve assembly 50 also includes a more or less conventional pilot valve assembly shown generally at 67 in block 66 which is opened (and perhaps closed) by a solenoid actuator 68 threaded into the top of block 66. As is well known in the art, when the actuator 68 opens the pilot valve in assembly 66, the water flow through that assembly alters the fluid pressures above and below valve member 64 thereby causing that valve member to move away from the valve seat 62. Preferably, the valve assembly 50 includes a filter 72 at the underside of the valve member 64 to prevent any dirt entrained in the feed water from clogging the passages in the pilot valve assembly 67.

In the illustrated valve, the cylindrical block 66 which supports the valve member 64 and contains the pilot valve assembly 67 has a threaded lower end segment 66a which may be screwed down into the cup-like member 52, the side wall 52b of that member being internally threaded for that purpose. As shown in FIG. 2, a circumferential groove is provided adjacent to the upper end of block 66 to accommodate an O-ring 73 which forms a fluid-tight sliding seal between block 66 and the side wall of housing section 10a. Preferably, slots 66b are provided in the top of block 66 to facilitate screwing and unscrewing the block. The housing section 10a is counterbored at 75 down to the level of block 66 and the counterbore is threaded to accommodate an annular exteriorly threaded retainer 76 which may be turned down into the counterbore 75 to secure the valve assembly 50 within housing 10. Retainer 76 has a central opening 78 to provide clearance for actuator 68.

Cap 26 is arranged to seat on housing section 10a with the lower edge margin of the cap intermitting with the upper edge margin of housing section 10a. The cap is releasably held in place by set screw 28 which extends through a threaded opening 82 in the side wall of housing section 10a and protrudes into a passage 84 formed in the side wall of cap 26.

Cap 26 contains the electrical components for controlling actuator 68. These are mounted to a support structure 86 which includes a discoid base 86a which fits snugly within the cap. Preferably in O-ring 88 encircles base 86a so that the support structure is held in place by frictional engagement of the O-ring with the inside surface of cap 26.

In the illustrated valve, the support structure 86 supports a control circuit 92 and a voltage source in the form of a battery B which provides power for actuator 68 and control circuit 92. The valve includes a capacitive touch pad 94 in the top of cap 26. When a person touches the touch pad, it causes the control circuit 92 to activate actuator 68 which results in the valve member 64 being unseated from the valve seat 62 for a selected period of time. However, the valve could just as well be designed to initiate a flush cycle upon sensing the presence of a person near the valve. In that event, the control circuit 92 would include a conventional infrared or ultrasonic proximity sensor.

It should be understood also that the main valve assembly 50 may be of any known type which may be actuated by any known means such as by a push-type switch or even a manual actuator, e.g., a lever or toggle, a push button, etc. or a combination of the two, i.e., an electronic actuator of some kind with a manual override.

Also, while the illustrated valve has a side inlet 12 and a vertical outlet 14, the present invention is equally applicable to a valve whose main valve assembly operates in reverse i.e., wherein fluid enters at flow conduit 14 and leaves the valve at conduit 12.

In any event, it is a feature of the present flow control valve that the entire valve assembly 50 can be removed from the valve housing 10 without having to turn off the feed water to the valve. This is because the flow control valve has a built in check valve shown generally at 100 within the housing in the flow path between the valve inlet (be it at 12 or 14) and valve assembly 50. During normal operation of the flush control valve, the check valve 100 is open allowing water to flow from the valve inlet to valve assembly 50. However, if valve assembly 50 should be removed from housing 10, check valve 100 automatically closes to stop that water flow.

Figure 3:
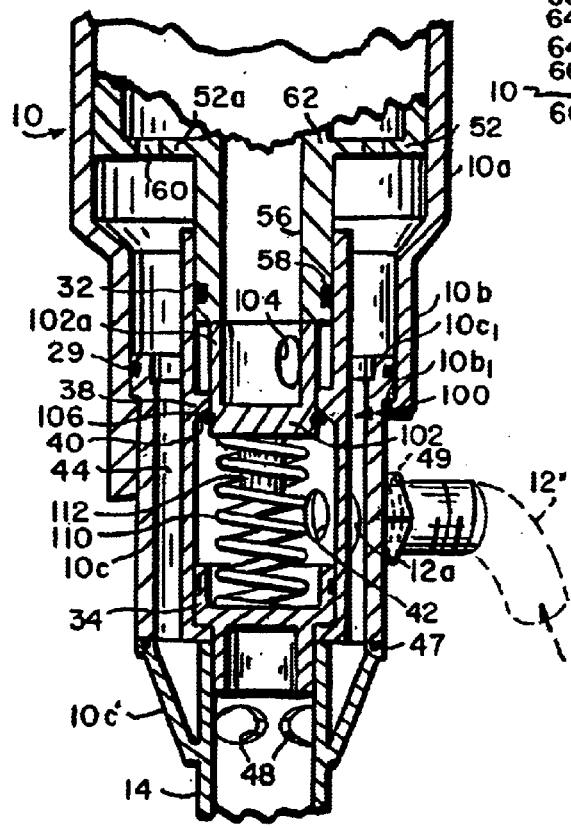
FIG. 3 is a similar view showing the valve's automatic shut off in its enabled or closed condition.

As shown in FIGS. 2 and 3, the check valve 100 includes a cup-like valve member 102 which is slidably received within the opening defined by the flange 38 in tube 32. Valve member 102 is formed with a side wall 102a having a hole 104 therein. A circumferential groove is formed in valve number 102 near the bottom thereof to accommodate an O-ring 106. Valve member 102 is movable between a lower open position shown in FIG. 2 and an upper closed position illustrated in FIG. 3. When the valve member is in its lower position, the hole 104 therein is located below the flange 38 so that water entering the flush control valve through inlet 42 can flow through opening 42 along the annular space 44 and through the hole 104 in the valve member 102 and along the neck 56 to the valve assembly 50 as shown by the arrows in FIG. 2. Accordingly, when the flow control valve is actuated and the valve member 64 of valve assembly 50 is unseated from valve seat 62, water will flow over the valve seat 40 and down through the holes 60 in cup-like member 52 and down along the annular spaces, 44 and 46 and through holes 48 to outlet 14 following the path indicated by the arrows in FIG. 2. If conduit 14 is the valve inlet, the above flow path is reversed.

On the other hand, when valve member 102 is in its upper closed position shown in FIG. 3, the hole 104 in the valve member 102 is situated above flange 38 and the O-ring 106 is seated against valve seat 40 so that the water from inlet 12 can no longer flow past that valve seat.

Still referring to FIGS. 2 and 3, valve number 102 is biased toward its upper closed position by a coil spring 110 compressed between the cup-like bushing 34 and the underside of the valve member 102. The lower end of spring 110 is centered by the bushing and the upper end is centered by a stem 112 extending down from the underside of valve number 102 into the top of the spring.

In accordance with the invention, the valve number 102 is normally maintained in its lower, open position by the lower end of neck 56 which is seated on the tube flange 38 over hanging valve member 102. Thus, as long the valve assembly 50 is in place within housing 10, the check valve 100 remains open as shown in FIG. 2. However, if it becomes necessary to clean, repair or replace any part of the valve assembly 50 requiring removal of the valve assembly from housing 10, the neck 56 will no longer overlie the valve member 102. Resultantly, that member will, under the bias of spring 110, automatically move to its upper closed position shown in FIG. 3, thereby stopping the flow of the water along the tube 32 beyond valve seat 40.

In order to perform maintenance on valve assembly 50, the set screw 28 is loosened enabling the removal of cap 26 from the top of housing 10. Then, the retainer 76 is unscrewed from the housing section 10a giving access to the valve assembly 50. At this point, the entire valve assembly including cup-like member 52, 56 and block 66 carrying valve member 64, pilot valve assembly 67 and filter 72 can be separated from housing 10.

With the removal of the valve assembly 50, all of the critical components of the flow control valve become readily accessible simply by unscrewing the block 66 from the member 52. The separation of those two components exposes all of the internal workings of the valve including the pilot valve assembly 67, the filter 72, the water exit holes 60 in member 52, the diaphragm 64 and even the primary valve seat 62. Thus, all of those fluid passages, parts and surfaces can be cleaned, repaired or replaced as needed with a minimum amount of effort. Upon the reseating of the valve assembly 50 in housing 10 and the tightening of retainer 76, the neck 56 of member 52 will move the valve member 102 of check valve 100 downward to its FIG. 2 open position thereby reestablishing the fluid path from inlet 12 to the neck 56 and thence to the valve assembly 50. As soon as the cap 26 is secured to the top of housing 10, the flow control valve is ready for normal operation. It is not necessary to access any manual control valve to reestablish water flow to inlet 12.

It will be appreciated from the foregoing that the incorporation of the automatic check valve 100 in the valve housing 10 does not add appreciably to the overall cost of the flow control valve because the check valve is composed of simple parts which can be made in quantity in relatively low cost. Also, the presence of the check valve 100 in the flow control valve does not complicate the assembly of the overall valve. It should also be understood that valves other than flush control valves may incorporate the automatic shut off feature described above.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention described herein.

What is claimed is:

1. A flush control valve comprising
   a housing;
   a first fluid conduit extending into the housing;
   a tube mounted in the housing in axial alignment with the first fluid conduit, said tube having an interior flange defining a valve seat;
   a second fluid conduit extending into the housing, said second fluid conduit being in fluid communication with the interior of said tube adjacent to the valve seat;
   a valve member movable within the tube between an open position wherein the valve member allows fluid to flow from the first conduit along the tube past the valve seat and a closed position wherein the valve member seats against the valve seat stopping the flow of fluid along the tube past the valve seat;
   biasing means for biasing the valve member toward the closed position;
   a valve assembly for seating at a home position in the housing, said valve assembly including
      a tubular member slidably received in said tube, said tubular member having a first end engaging the valve member and a second end defining a second valve seat, said tubular member maintaining the valve member in said open position so long, as the valve assembly is at said seated position thereby establishing a fluid flow path between the second conduit and the tubular member to the second valve seat, and
   valve means for controlling the fluid flow from the tubular member past the second valve seat;
   means in the housing defining a fluid flow path between the second valve seat and the first fluid conduit, and
   a retainer for releasably retaining the valve assembly in said seated position whereby when said retainer is loosened thereby releasing the valve assembly, the valve member will be moved automatically by the biasing means to said closed position.

2. The valve defined in claim 1 wherein the biasing means comprise a coil spring engaging said valve member.

3. The valve defined in claim 1 wherein the valve means comprises
   a diaphragm;
   a support for supporting the diaphragm opposite the second valve seat so that the diaphragm can move between a seated position against the second valve seat and an unseated position wherein the diaphragm is spaced away from the second valve seat, and
   means for moving the diaphragm between said seated and unseated positions.

4. The valve defined in claim 3 wherein said means for moving the diaphragm include a solenoid actuator secured to said support.

5. The valve defined in claim 4 wherein said means for moving the diaphragm also include a pilot valve responsive to said actuator for moving the diaphragm from said seated to said unseated position.

6. A flow control valve comprising:
   a housing having a fluid inlet and a fluid outlet and defining a fluid flow path between the inlet and the outlet;
   a check valve positioned in the housing, said check valve including a valve seat in the flow path from the inlet, a valve member movable between a seated position against the valve seal blocking fluid flow from the inlet past the valve seat and an unseated position spaced away from the valve seat, and a resilient member that biases the valve member toward said seated position, and
   a valve assembly removably positioned at a home position in the housing in said flow path to control the fluid flow from the check valve to the outlet, said valve assembly including:
      A) a valve assembly portion that engages the valve member and maintains the valve member in said unseated position so long as the valve assembly is at said home position, said valve member being moved to said seated position by the resilient member when said valve assembly leaves said home position
      B) a primary valve seat connected to the valve assembly portion,
      C) a primary valve member movable between a closed position against the primary valve seat and an open position spaced thereform, and
      D) an actuator, including an electric switch or a proximity switch, for moving the primary valve member to said open position.

7. The valve defined in claim 6, wherein said resilient member is a coiled spring.

8. The valve defined in claim 6 wherein
   the housing includes an first section, a second section, and means for rotatably coupling said first and second section together for relative rotation about a common axis, and
   the fluid inlet connects to the first section and the fluid outlet connects to the second section.

9. The valve defined in claim 8 wherein the fluid inlet extends the side of the first section and the fluid outlet extends from the bottom of the second section.

10. A flow control valve comprising:
   a housing having a fluid inlet and a fluid outlet and defining a fluid flow path between the inlet and the outlet;
   a check valve positioned in the housing said check valve including valve seat in the flow path from the inlet, a valve member movable between a seated position against the valve seat blocking fluid flow from the inlet past the valve seat and an unseated position spaced away from the valve seat, and a resilient member that bias the valve member toward said seated position, and
   a valve assembly removably positioned at a home position in the housing in said flow path to control the fluid flow from the check valve to the outlet, said valve assembly including:
      A) a valve assembly portion that engages the valve member and maintains the valve member in said unseated position so long as the valve assembly is at said home position, said valve member being moved to said seated position by the resilient member when said valve assembly leaves said home position, B) a primary valve seat connected to the valve assembly portion, C) a primary valve member movable from a closed position against the primary valve seat and an open position spaced therefrom, D) a pilot valve which, when it opens, opens the primary valve member, and E) an actuator for opening the pilot valve, and moving the primary valve member to said open position thereof.

11. The valve defined in claim 10 wherein the housing includes an first section, a second section, and means for rotatably coupling said first and second section together for relative rotation about a common axis, and the fluid inlet connects to the first section and the fluid outlet connects to the second section.

12. The valve defined in claim 11 wherein the fluid inlet extends the side of the first section and the fluid outlet extends from the bottom of the second section.

13. The valve defined in claim 10, wherein said resilient member is a coiled spring.

14. The valve defined in claim 10 wherein:

A) the actuator comprises the solenoid actuator linked to the pilot valve, and

B) the valve includes a solenoid driver coupled to the solenoid actuator for driving thereof.

* * * * *

UNITED STATES PATENT AND TRADEMARK OFFICE
CERTIFICATE OF CORRECTION

PATENT NO.    : 6,871,835 B2
DATED         : March 29, 2005
INVENTOR(S)   : Natan E. Parsons It is certified that error appears in the above-identified patent and that said Letters Patent is hereby corrected as shown below:

<u>Title page,</u>
Item [75], Inventors, please replace "Natan F. Parsons" with -- Natan E. Parsons --

Signed and Sealed this

Twenty-fourth Day of May, 2005

JON W. DUDAS
*Director of the United States Patent and Trademark Office*